F. K. Samek, INVENTOR

By: Marks & Clark, Attys.

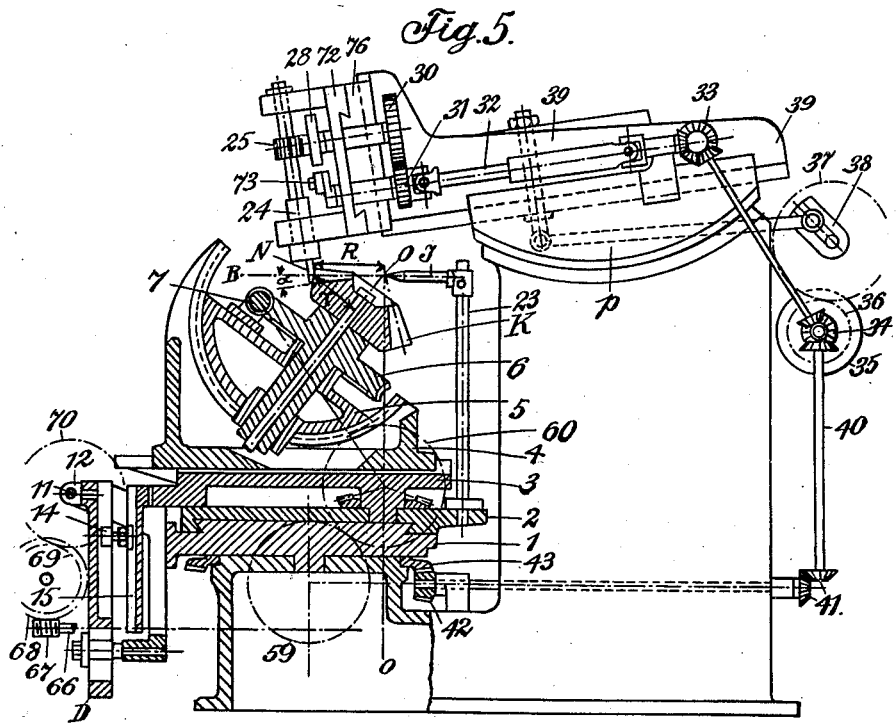

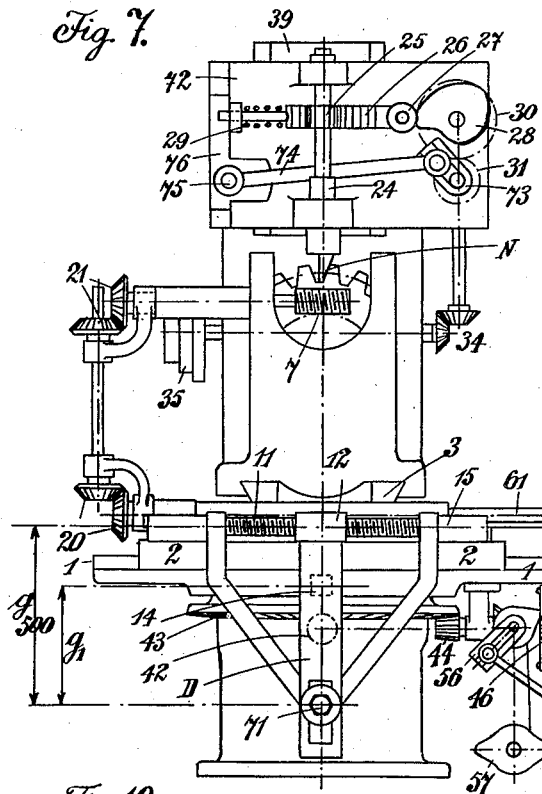

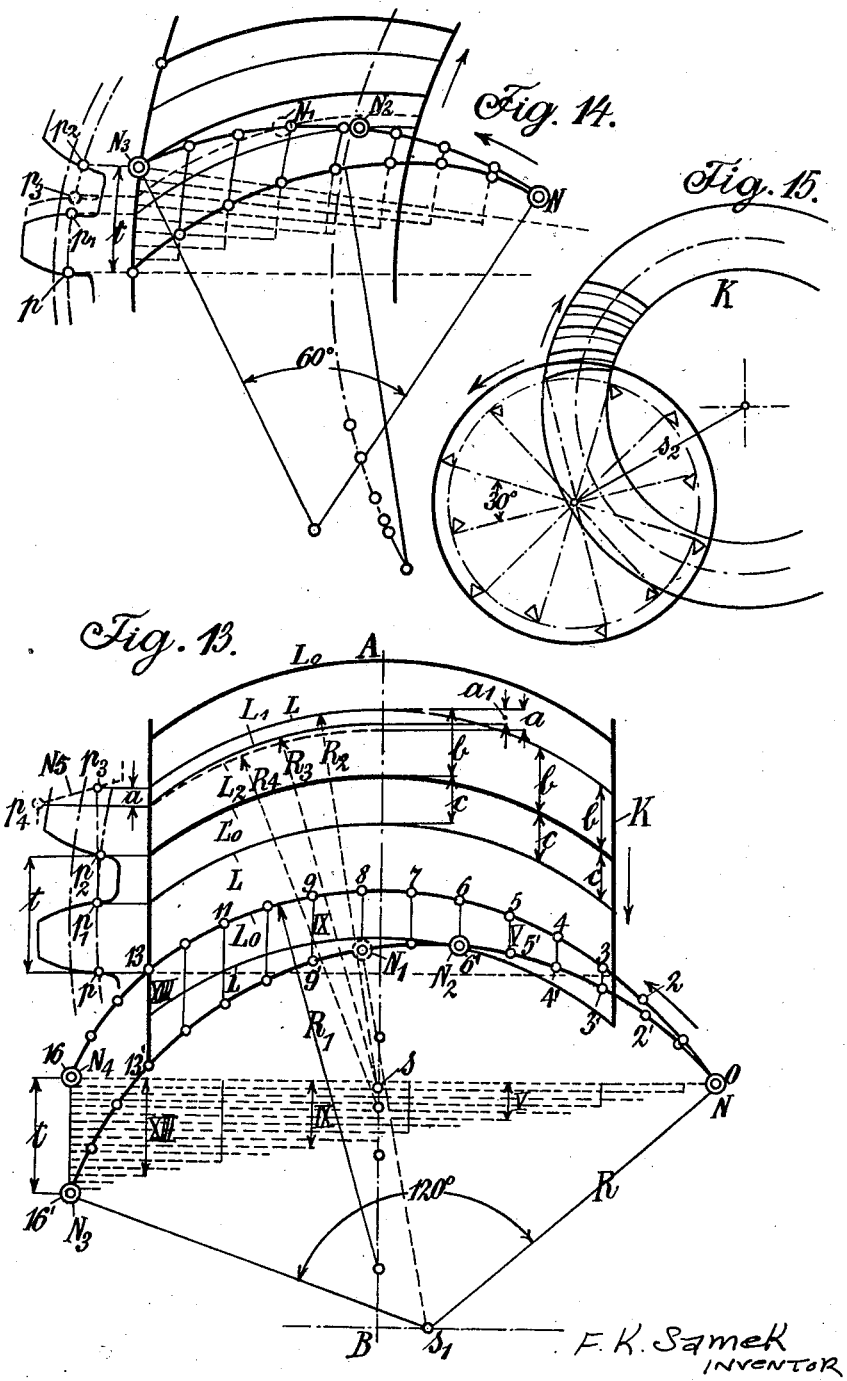

Dec. 17, 1935.   F. K. SAMEK   2,024,747
MANUFACTURE OF SPUR AND BEVEL WHEELS
Original Filed March 16, 1933   7 Sheets-Sheet 5

F. K. Samek
INVENTOR

Marks & Clerk
Attys

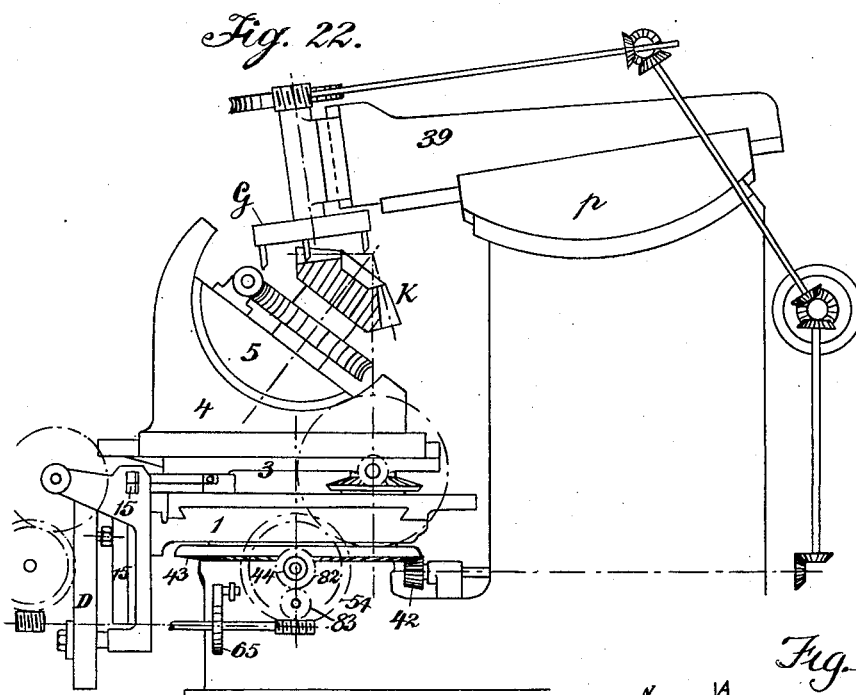
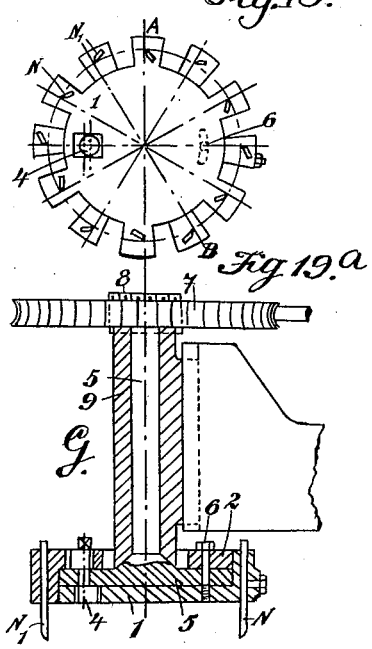
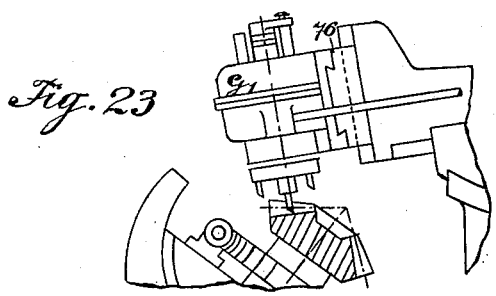
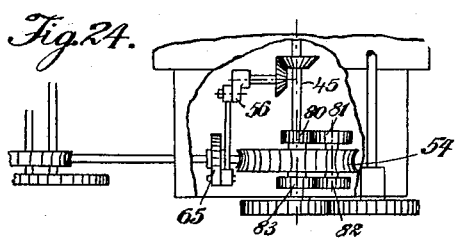

Patented Dec. 17, 1935

2,024,747

UNITED STATES PATENT OFFICE 2,024,747

MANUFACTURE OF SPUR AND BEVEL WHEELS

Franciszek Kacper Samek, Miedzylesie, near Warsaw, Poland

Application March 16, 1933, Serial No. 661,196. Renewed October 23, 1935. In Poland June 26, 1929

9 Claims. (Cl. 90—9)

This invention is based on the possibility of producing regular straight, helical, curved and double helical teeth, even with the rounded off points and ends, with a regular involute profile in every section, on spur and bevel wheels, not as hitherto by means of special tools such as for instance templates, profile cutters etc., but by means of an ordinary cutter with a straight cutting edge.

The new process makes it possible to obtain a strictly regular tooth profile which could not be done for instance on bevel wheels by means of the process known up to now, as the tooth profile was produced on the imaginary mating cone and not on the spherical surface.

The same applies to that part of the tooth profile which is situated between the base circle and the root circle, for with the new process even that part is produced in a perfectly regular manner.

The process itself and the devices required for carrying it into practical effect, are diagrammatically illustrated by way of example in the accompanying drawings.

Fig. 1 is a perspective diagrammatic view showing the formation of involute teeth on a spur gear by the rolling generating process, Figs. 2 and 3 are perspective diagrammatic views showing the formation of involute teeth on bevel gears, Fig. 4 is a diagram showing the line of travel of a cutting tool, Figs. 5, 6, 6a and 7 are respectively a side elevation, partly in section, a plan view, a detail of Fig. 6 and a front end elevation of a constructional form of machine for cutting regular involute teeth on gear wheels, Fig. 8 is a detail view showing the position of the tool when cutting the two sides of a tooth, Figs. 9 and 9a are a side elevation and plan of a detail, Fig. 10 is a diagram showing the formation of double helical teeth on gear wheels, Fig. 11 is a side elevation of a gear blank holder set up in position with a spur gear blank mounted thereon, Fig. 12 is a diagram showing the motion of the cutter, Fig. 13 is a diagram showing the generation of arcuate teeth on a spur gear, Fig. 14 is a diagram showing the generation of arcuate teeth on a bevel gear, Fig. 15 is a diagram showing the cutting action of a rotary disc cutter, Fig. 16 is a diagram showing the generation of double helical teeth on a spur gear, Fig. 16a is a motion diagram of a detail, Fig. 17 is a diagram showing the generation of double helical teeth on a bevel gear, Fig. 18 is a diagram illustrating the engagement of a pair of mating double helical gear wheels, Fig. 19 is a bottom plan view and Fig. 19a is a vertical central section through a rotary cutter head, Fig. 20 is a bottom plan view and Fig. 21 a vertical central section through a rotary cutter head having revolving cutters, Fig. 22 is a side elevation of a gear cutting machine similar to Fig. 5 but adapted for cutting arcuate teeth, Fig. 23 is a side elevation of part of the machine shown in Fig. 22 arranged for cutting double helical teeth, Fig. 24 is a part plan view of part of the transmission mechanism operatively connecting the blank holder to the tool carrier in Fig. 22.

Figure 1 is a diagram showing the formation of various involute teeth on a spur wheel, K being its base circle. The axis of the wheel K is stationary. The surface BB rolls on the wheel K without slipping and turns the wheel K accordingly. The points $e$, $e^1$, $e^2$, $e^3$ have developed the involutes E, $E^1$, $E^2$, $E^3$. The lines S, $S^1$, $S^2$ are at right angles to the surface BB and pass through the points $e$, $e^1$, $e^2$, $e^3$ and are tangent to the involute at the said points. If the points are situated on a straight line $e$—$e^3$ and a straight cutting edge which coincides with S is moved along the said line after each periodic movement of the surface BB on the wheel K, the said cutting edge will cut a straight tooth.

If, however, the points are situated on an arc or on an angular line $e^4$—$e^8$ and the cutting edge is moved along the said line, the said cutting edge will cut a curved or a double helical tooth.

The same thing will happen when the motions are interchanged, that is, when the cutter travels along a straight line $e^4$—$e^8$, and the wheel K makes during the movement of the cutter a suitable movement of oscillation about its axis, independently of the movement for the generation of the involute.

Figure 2 gives the same diagram for bevel wheels. Here the surface B is a flat circular disc. Its axis passes through the cone apex O. If the axes of the flat disc B and of the cone K are stationary, and the surface B rolls on the cone K without slipping, the point $e$ which has arrived at $e^1$ will develop an involute E from the cone K. As the point $e$ is always at the same distance from the cone apex O, which distance is equal to the generatrix of the cone K, the involute E will be described on a spherical surface and not on the imaginary mating cone, which in the case of arcuate or helical teeth is imperative.

1. The cutter edge S on the left hand side of the figure is at right angles to the surface T—T which rolls with S on the base circle K.

2. The same cutter edge S, on the right-hand side is inclined at an angle of 15° to the surface $T^1$—$T^1$ and moves with the surface $T^1$—$T^1$ which however rolls on the pitch circle Kt.

In cutting the teeth on spur wheels, both processes are applicable, whether for straight or double helical teeth.

In cutting the teeth on bevel wheels, straight or helical teeth may be cut by both processes, but double helical teeth can only be produced by the first process for the following reasons. In the first process (the cutting edge at right angles to the generating surface) one point of the cutter edge cuts the involute, whereby the involute is produced on a spherical surface.

Figure 4:
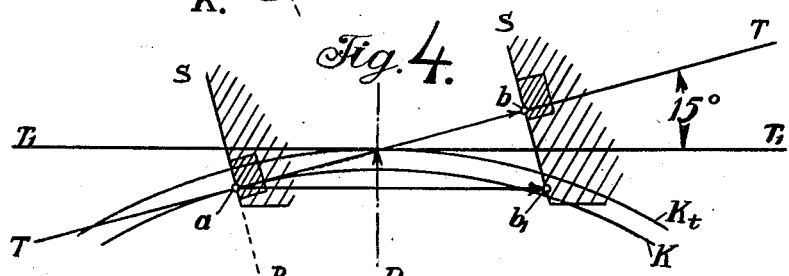
Figure 4 illustrates two processes for the production of the involute. Here K is the base circle, and Kt the pitch circle.

In the second process, the cutting point on the straight cutter edge travels from $b$ to $b_1$, Figure 4, whereby the distances (generatrix) from the apex of the work to $b$ or eventually $b_1$ are different, that is to say, the involute is produced not on the spherical surface but on the imaginary mating cone. For the production of straight or helical teeth, whether on spur or bevel wheels, the one or more cutters move rectilinearly. For the production of curved teeth, the cutters have a circular motion, and for the production of double helical teeth, the cutter motion may be rectilinear or circular.

Figures 5 to 7 show a universal machine for producing straight, helical, curved or double helical teeth on spur and bevel wheels, the cutter motion being rectilinear or circular.

Figure 5 shows a part section along the line A, A in Figure 6 and a part side elevation. Figure 6 is a view from above after removal of the cutter slide. Figure 7 is a front view.

Figure 1:
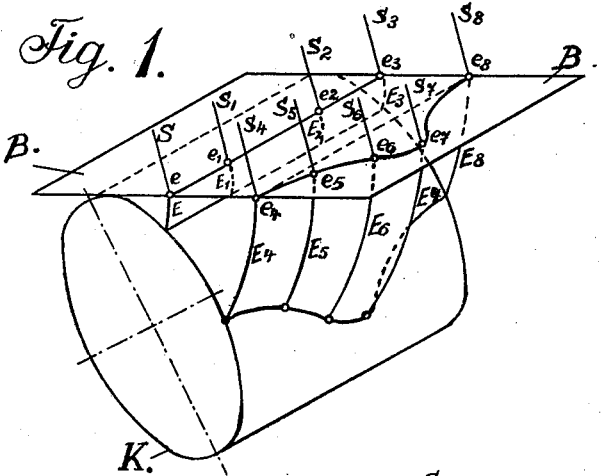
Figures 2, 3:
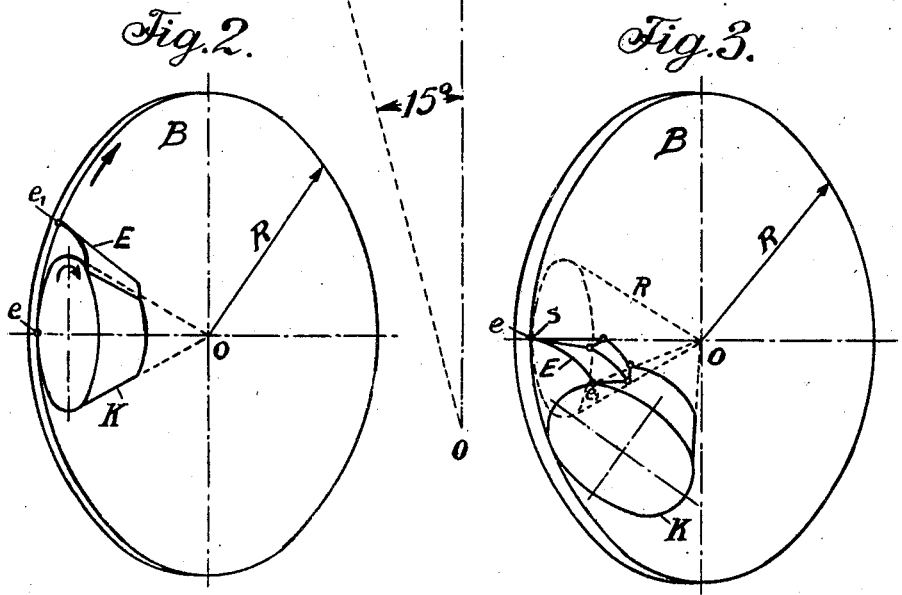
Figure 3 is a similar diagram but with interchanged motions, that is to say, the flat disc B is stationary, and the cone K rolls without slipping on the same, the form of tooth shown being double helical.

On the machine frame is provided a swivel carriage 1 (Figure 5) and on the latter a cross slide carriage 2, on which the swivel carriage 3 is adapted to rotate about the axis OO. On the carriage 3 is mounted the longitudinal slide 4 and on the latter the blank holder support comprising the half-moon carriage 5. In the carriage 5, the worm wheel 6 is turned by the worm 7. The blank is fixed to the worm wheel. The swivel carriage 1 is unnecessary for the production of teeth on bevel wheels, and the slide 2 is only necessary for adjusting the blank so that the path of the end point X of the cutting edge (Figure 8) passes through the apex of the cone. The blank K must be so adjusted that the generatrix OB (Fig. 5) of the pitch cone is parallel to the rotating surface of the carriage 3, that is to say, horizontal, i. e. so that the pitch cone rolls on the imaginary rolling surface OB, corresponding to the plane surface B in Figs. 1 and 3, the movements of which are made by the swivel carriage 3. Consequently the apex of the blank must lie in the axis of rotation OO of the carriage 3. The apex or the axis OO is indicated by the pointer T slidable on the upright 23. The end of the cutter must extend to the root circle, therefore the cutter slide guide $p$ must be turned through the angle $\alpha$ (Figure 5). By means of the slide 4, the blank is so placed that the apex falls on the axis OO. The carriage 5 is so turned that the upper generatrix of the pitch cone is horizontal. After adjustment, carriage 2 is screwed fast to 1 and the latter to the frame, carriage 4 is screwed fast to 3, carriage 5 to 4 and finally the slide guide $p$ is screwed fast to the frame, since for forming the involute, that is to say for rolling the pitch cone on the imaginary surface, only the rotational motions of the carriage 3 and the worm wheel 6 and the longitudinal motion of the cutter are necessary.

On the universal machine for gears, cutting of the teeth is effected with one cutter having a rectilinear motion or several revolving cutters, cutting taking place, in the case of one cutter, in both directions.

The method of cutting straight teeth with one cutter in both directions is shown in Figure 8. The cutter N is fixed in the spindle 24 (Figures 5 and 7) and in one direction cuts the side $a$ of the tooth (Figure 8), whereupon the cutter turns through 180° and cuts the side $a_1$ of the tooth, and then $a_2$ and so on. The rotation of the cutter through 180° is produced by the cam 28 (Figure 7) which slides the rack 26 with the roller 27, the said rack rotating the spur wheel 25 keyed to the spindle. The helical spring 29 presses the rack and the roller against the cam. (The cam is shown for double helical teeth). To the same shaft as the cam is keyed the spur wheel 30 driven by the spur wheel 31 (Figure 5) which latter is rotated by the belt pulley 35 by means of the jointed shaft 32 through gears 33, 34.

The cutter slide 39 is driven off the said belt pulley 35 by means of the gears 36, 37 and the crank 38 with adjustable pin (Figure 5) or in any other way.

According to Figure 8, the blank after each cut of the tooth, that is on passing from $a$ to $a_1$, must be turned through $t_1$, and then on passing from $a_1$ to $a_2$, through $t_2$, where $t_1+t_2$ is the pitch. This is accomplished as follows: The rotational motion passes from the belt pulley 35 through bevel wheels 34, shaft 40, bevel wheels 41, 42, connecting bevel wheel 43 (Figure 5), to bevel wheel 44 (Figures 6 and 7) which rotates the shaft 45. On the end of the shaft 45 which is splined, is slidably mounted one half 46, of a friction clutch (Figure 7) which is prevented from rotating on the shaft by means of a key engaging the spline of the shaft 45. The clutch half 46 is adapted to turn by friction the second half 47 of the clutch (Figs. 6, 7, 9). The clutch half 47 is keyed on the shaft 53 and has a fixed projecting lug 50 and an angularly adjustable plate having a lug 51 (Figure 9) is mounted on the clutch half 47. The plate having the lug 51 is adjusted to space the lugs 50, 51 angularly in accordance with the magnitudes $t_1$, $t_2$ (Figure 8), A worm wheel 54 is loose on the shaft 53, said worm wheel being in engagement with a worm 66 (Fig. 7), and a pin 55 is mounted in the worm wheel 54 so as to be slidable along its axis, so as to engage the lug 50 or 51 and arrest the clutch half 47 (Figures 6, 7). The pin 55 is fixed on a yoke piece 58 which is loosely mounted on the hubs of the clutch half 46 and the worm wheel 54.

The rotational movement is transmitted from the shaft 45 to the crank shaft 56 (Figures 6, 7) in such a way that the shaft 56 rotates at the same speed as the crank shaft 38 (Figure 5) which drives the cutter slide. The shaft 56 has keyed on it a cam 57 (Figure 7) which, on the change of stroke of the cutter, displaces the yoke piece 58 with the pin 55 and at the same time compresses the spring 58a, whereby the coupling half 46 is resiliently pressed against the coupling half 47 with sufficient force to turn the latter until the cam 57 has released the yoke piece 58 which is moved back, together with the pin 55, under the action of the spring 58a. The pin 55 then lies in the path of the lugs 50 and 51 and arrests the motion of the coupling half 47 relatively to the worm wheel 54 when the next succeeding lug 50 or 51 comes into contact with it. The shaft 53 transmits the rotation to the compound gears 59, 60, shaft 61, three bevel gears 19 (Figure 6), bevel gears 20, 21 to the worm 7, worm wheels 6 and finally to the blank. The gears are calculated as follows: If the worm wheel 6 has, for example, 60 teeth, and the blank likewise 60 teeth, the change wheels 59 and 60 are as 1:1. If the blank has, for example, 42 teeth, the change gear 59 must have 60 teeth and the gear 60 must have 42 teeth, that is $$\frac{60}{42} \text{ or } \frac{30}{21}$$

etc. Thus, after each cut of the cutter the feed of blank by $t_1$ or $t_2$ is obtained, it being possible to regulate $t_1$ and $t_2$ as desired, for example, for abnormal tooth spaces.

The feed for the formation of the involute

According to Diagrams 3 and 4, for the purpose of obtaining the regular involute, the pitch cone of the blank (for the cutter inclined at 15°) or the base cone (for the vertical cutter) must roll on its rolling surface without slipping. These motions are imparted as follows to the blank by means of the rotary carriage 3 and the worm wheel 6 independently of the previously described rotation for the pitch of the teeth. The crankshaft 56 (Figures 6 and 7) moves the ratchet pawl and ratchet wheel 65 which is keyed on the shaft 66. On the same shaft is keyed the worm which rotates the worm wheel 54, and in this way the feed is added to or subtracted from the previously described movement for the pitch of the teeth, both movements being transmitted to the blank. Simultaneously, by the same shaft 66, acting through worm 67 (Figure 5) worm wheel 68, spur wheels 69 and 70, and screw 11 (Figure 6), the nut 12 is displaced. The nut 12 has a pin by means of which the transmission gear lever D (Figures 5, 6 and 7) is moved. The lever D slides the block 14 which is adapted to be adjusted and fixed in the steel strip ledge 15. The ledge 15 is connected by two steel strips 15' and 15" to the carriage 3. Each strip is screwed by one end to the ledge 15 and by the other end to the carriage 3 (Figure 6). The setting of the pin 14 depends upon the dimensions of the blank and is calculated as follows: The pivot 71 (Figure 7) of the lever D is stationary and the distance of its axis from the axis of the screw 11 is normally a round figure, for example 500 millimetres (Figure 7). The gear ratios are so calculated that for a blank (bevel wheel) of 60 teeth, the radius $r$ and generatrix $R$ (Figure 5) of which are equal, the pivot 14 is set in the axis of the screw 11. If $r$ is smaller than $R$, and the number of teeth Z of the work is not 60 but, for example, 42 teeth, the setting distance $$g_1 = \frac{g \cdot r \cdot 42}{R \cdot 60}.$$

If $g_1$ is too small, resulting in too scanty a movement of the carriage 3, whereby the involute is not cut out at the top of the tooth, the change gears 69, 70 (Figure 5) which are as 1:1 are altered to 1:2 or 1:3 etc. In this case, $g_1$ will likewise be two or three times greater. Example:

$$r = 200, \ R = 300, \ z = 42,$$

then $$g_1 = \frac{500 \cdot 200 \cdot 42}{300 \cdot 60} = 233 \cdot 333.$$

If the change gears $$\frac{69}{70} = \frac{1}{2}$$

are put in, then $g_1 = 466 \cdot 666$.

The transmission lever, in gear machines, saves many change gears which often cannot be constructed, as for example in this case, where the wheels should have a number of teeth of 500000 x 233333.

Helical teeth

As previously mentioned, for straight teeth, the machine must be so adjusted that the prolongation of the path of the end point of the cutting edge X (Figure 8) passes through the apex of the blank along the line AA (Figure 6a), but for helical teeth, on the contrary, the path passes along the line $A_1 A_1$.

In cutting the second blank, which is to mesh with the first blank, the displacement of the line $A_1 A_1$ must be exactly the same, but on the other side. Apart from this, no alteration is made in the machine.

Double helical teeth are obtained according to the diagram (Figure 10). $h$ is the width of the tooth. If, during the path $h$ of the cutter in one direction, the crank $k$ (Figure 10) makes one revolution and displaces the cross carriage 72 to a corresponding extent (Figure 7), the cutter will travel through an angular path (sinusoid) resulting from the longitudinal motion and the transverse motion, that is to say, it will cut out a double helical tooth with rounded apex and rounded ends. The rounding of the tooth ends imparts great strength to the tooth. At the end of the previously mentioned jointed shaft 32 (Figure 5) which is mounted in the carriage 72, there is keyed the crank 73 (Figure 7) with adjustable pin. The crank 73 makes four times as many revolutions as the crank 38 (which moves the cutter slide), and, by means of the connecting rod 74 and its pin 75 (Figure 7) engaging firmly in the carriage 76, swings the cross carriage 72 and ultimately the cutter N, whereby the cutter describes a sinusoid.

In each position, the cutter must keep the proper cutting angle, which is easily accomplished by the use of a suitable cam 28 (Figure 7), which at the same time causes the rotation through 180° on reversing the stroke.

The depth of tooth is adjusted and fixed by means of the carriage 76 (Figure 5). The remaining motions and adjustments of the machine are as for straight teeth. The cutter slide may be moved in any desired manner. In using the crank, the cutter works as shown in Figure 12. The shaded parts are the cutting and the unshaded parts are the idle stroke.

It should also be noted that the oscillatory motion of the crank $k$ for the purpose of obtaining double helical teeth may be imparted either to the cutter or to the blank, which will be discussed further. In the latter case, if the cutter has only the rectilinear motion, while the blank oscillates, the crank 73 and carriage 72 are unnecessary. If the blank is a spur wheel, the carriages are adjusted as shown in Figure 11, and in addition the rotary carriage 3 is screwed together with the carriage 2, whereby the ledge 15 (Figures 6, 7) slides the carriage 2 according to the diagram in Figure 1. For helical teeth on spur wheels, the carriage 1 is turned through the angle of inclination of the helical tooth. In machines specially intended for spur wheels, the carriages 3, 4 and 5 and the turning slide guide $p$ (Figure 5) are unnecessary.

*Process for the cutting of curved or circular and double helical teeth with circular movement of the cutters*

Machines are already known for the cutting of curved or circular teeth on toothed wheels, but it is also known that they cannot produce teeth of regular profile.

The production of a regular helical, curved or double helical tooth may be imagined to consist in a straight tooth, for instance of a spur wheel, being cut with several surfaces at right angles to the axis of the toothed wheel, and in the said cuts being moved parallel to their previous position on a helical, curved or double helical line, the dimensions $b, b, b$, or $c, c, c$, (Figure 13) being equal to each other.

In the well known machines for the cutting of curved teeth, the cutting edges of the cutters are inclined at an angle of 15° to the axis of rotation of the cutter disc.

The point $p^3$ of the cutting edge N5 (Figure 13) rotates on the radius R2, and the point $p_4$ on the radius R3 about the joint axis $s$. The distance $a$ in side elevation must be the same in all the sections, that is to say, also in the section A—B, which would be possible only if the radii R2 and R3 were equal. In this case the radii are of different size, so $a^1$ in the section A—B is smaller than $a$.

A process will now be described which, in the same way as in the machines previously described, gives strictly regular profiles in each section, as the cutter edges are always at right angles to this surface, which rolls on the circle or cone for the purpose of developing the involute. All the points, which describe the profile, move on a circle of a radius R, owing to which the above-mentioned fault is avoided.

The second basis of this process consists in the blank making, during the cutting of curved teeth, an uninterrupted uniform rotation from the beginning to the completion of all the teeth.

Figure 13 shows a diagram for obtaining curved or circular teeth on spur wheels.

When a point ON which represents the plan of the cutter edge is moved uniformly on the circle of the radius R and arrives at the point 16'N3, it will have described the arc ON-16'N3. If the wheel K is uniformly turned about its axis in the direction of the arrow with such a speed that during the path ON-16'N3 the wheel K covers the distance $t$=pitch, there will be produced as the resultant of these rotations on the wheel K a curve ON-16N4. The section of this curve on the wheel K from 3-13 is very similar to the arc of circle of the radius R1 and will be symmetrical if the axis $s1$ is moved correspondingly away from the line A B.

The involute profile on curved teeth is produced in the following manner: if the points O and 16' are as already stated the cutter edges, that is to say N and N3, and if a second movement is given to them in accordance with the diagram Figure 4, that is to say, if they are moved on the surface T or T1 (Figure 4) or B—B (Figure 1) independently of the previously described circular movement, and if, at the same time, the wheel K is turned in accordance with the movement of the surface T or T1 (Figure 4), independently of the previous rotation by the pitch $t$ (Figure 13), then three cutters secured to a disc at a distance of 120° will cut one side (heavy lines) of all the teeth on the wheel K. If on the same circle of the radius R there were mounted on the disc instead of three, six cutters at 60°, then of these six cutters, three cutters N, N3, N5 (N5 not shown in the drawings) set at 120° would cut alternately one, and the other three cutters the other side of all the teeth, and the thickness of the tooth and of the interval, measured on the base circle, or the distances between the lines L0—L and L—L'0 would be equal. In order to make the tooth thicker at the base line, three cutters must be shifted, for instance from the point 8' to the point 6', that is to say, from N1 to N2. If the cutter N1 is moved to the point 5', the tooth will be thicker still. In that way the thickness of the tooth can be regulated at will during the rough cutting or during the finishing.

Figure 14 shows the same as above, but for cutting teeth on bevel wheels. To the points $p$ and $p_2$ corresponds the position of the cutters N—N3 and to the other side of the tooth, that is to say, to the point $p_1$, corresponds the cutter N2. If the cutter is set like N1, the thickness of the tooth will be $p$—$p_3$.

Figure 15 shows the diagram of a disc with 12 cutters for the cutting of curved teeth on the bevel wheel K, the distance $s2$ being chosen in such a manner that the resultant forms the desired tooth arc.

*Double helical teeth*

Figure 16:
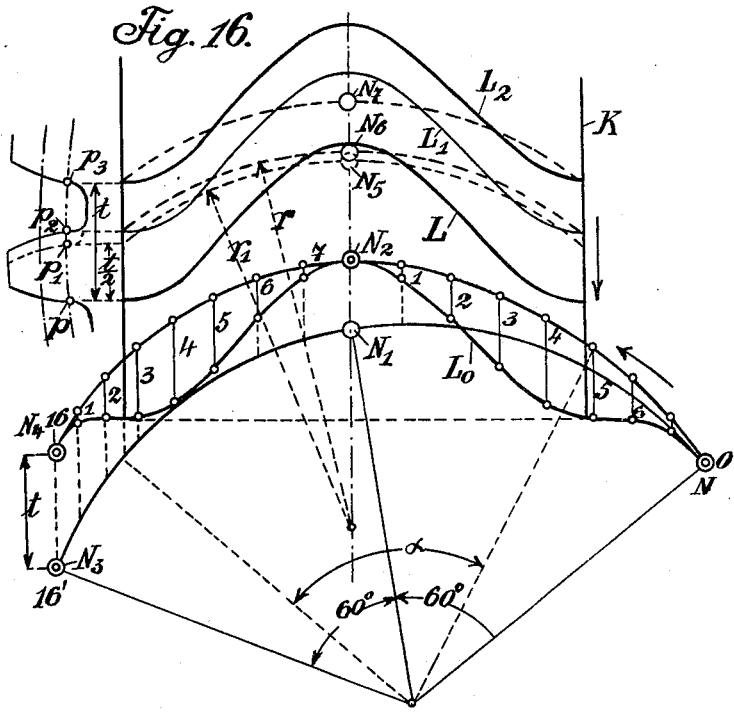
Figure 17:
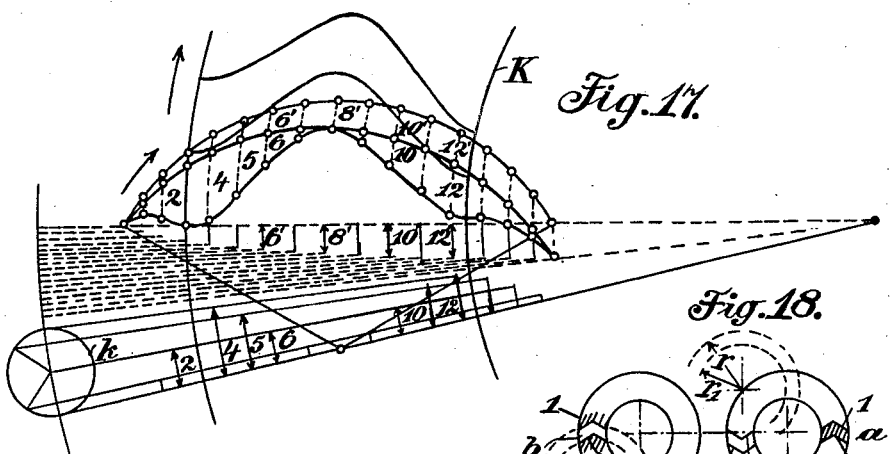

The Diagrams 16, 16a and 17 show the production of double helical teeth from curved teeth, namely Figure 16 on spur wheels and Figure 17 on bevel wheels.

Figure 16A:
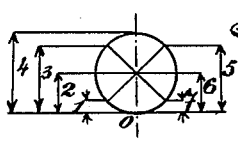

If the blank K and the cutters N, N1, N3 (Figure 16) have already the above described rotations which are required for forming curved teeth, and if the cutters or the blank K are further given by means of the crank $k$ (Figure 16a) an oscillating movement in the same way as described for the diagram of Figure 10, double helical teeth with rounded off points and ends will be produced.

Figure 18:
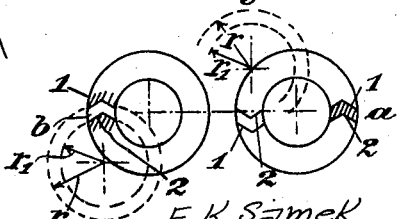

Figure 17 shows the same, but for bevel wheels where the oscillating movement is executed by the work or blank, the wave line becoming gradually flatter towards the apex of the bevel wheel. In the case of double helical teeth, all the cutters must remain at the same distance, for instance at 60° (Figure 16), as the crank $k$ makes one revolution during the travel of the cutter from N to N2 or N2 to N4. In this case the inclined lines L—L1—L2 will be produced on the wheel K at equal distances apart, that is to say, at half pitch. As, however, the thickness of tooth on the base circle is greater than half pitch, each second cutter must be shifted accordingly, that is to say from N5 to N6, so that one cutter will be on the radius $r$ and the next one on the radius $r1$. The result of this is that the lines L—L2 are exactly equal, but the line L1 is somewhat different. As, however, the lines L—L2 of one wheel will work with the same lines of the other wheel, and the line L1 will also work with the same line of the other wheel, the teeth, or the engagement of the lines L, will be maintained strictly regular, as shown in Figure 18. The tooth $a$ engages with the space $b$, that is to say, the tooth side 1 works with the space side 1 and they fit each other, as they have been produced with the same larger radius $r$. The same applies to the tooth and space side 2.

Figure 19 shows the cutter head with 12 cutters N—N1 for the cutting of curved teeth with revolving cutters. The cutting edges of the cutters are arranged in alternate direction for cutting one or the other side of the space. Six cutters N are secured to one disc 1, and the other six cutters N1 to the other disc 2. The two discs can be moved relatively to each other by means of an eccentric 4 which rotates in the spindle disc 5, owing to which each second cutter can be moved away from or brought nearer to the first one, for the purpose of maintaining the required tooth space according to the diagram of Figures 14 and 15. After the setting of the cutters, the two discs 1 and 2 are screwed fast to the spindle disc 5 by means of screws 6. At the other end of the spindle is keyed the worm wheel 7 which is driven by the worm 8. The spindle 5 is mounted in the bracket 9.

*Cutter head for cutting double helical teeth with revolving cutters*

Figure 20:
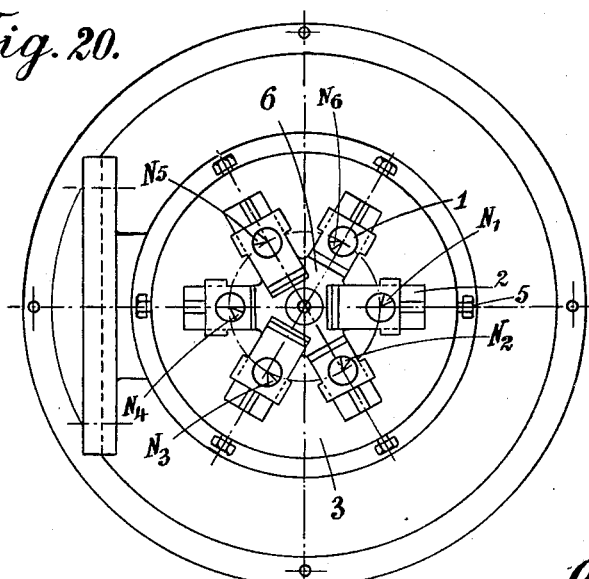
Figure 21:
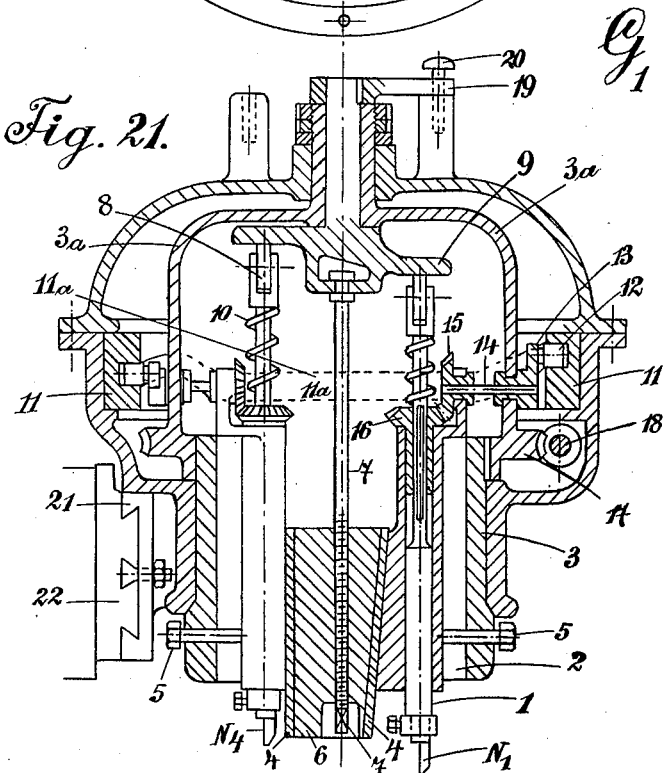

Figures 20 and 21 show a cutter head for cutting double helical teeth on spur and bevel wheels, where the cutters $N_1$, $N_2$ etc. have a circular motion. According to the diagram Figure 16, the diameter of the circle on which the cutters travel, depends on the width of the tooth, as the cutters cut the tooth only on an arc of the angle $\alpha =$ about 75° (Figure 16). To that end the cutters must be set to the corresponding diameter. Six cutters, the cutting edges of which are arranged in alternate directions for the cutting of one or of the other side of the tooth space, are fixed in the spindles 1 in such a manner that the cutting edges coincide with the axes of rotation of the spindles 1. The spindles 1 rotate in their square bearings which can be radially moved and locked in the recesses 2 of the main spindle 3. The movement or the setting of the spindle bearings is effected by means of packing pieces 4 of equal thickness, for instance 5 mm., of which several complete sets of six are provided. In the centre of the main spindle is mounted a hexagonal key 6, three sides of which are parallel to the axis, and three sides are oblique (Figure 21). The key is pulled in and out by means of the screw 7, with the result that only three cutters are moved in the radial direction, whilst the other three remain in position. By means of this key 6 the width of the space or the thickness of the tooth is set in accordance with the diagram Figure 13. After the setting of the cutters by means of the packing pieces 4 and of the key 6, the cutter spindle bearings are locked by means of the screws 5. At the ends of the cutter spindles 1 are mounted the rollers 8 (Figure 21) which roll on the surface 9 in such a manner that during the cutting, the cutters N6, N1, N2 are pulled out, and the other cutters are pulled back during the idle stroke by means of the springs 10. In the case of double helical teeth, the correct angle of cutting is maintained in the following manner:

The fixed or stationary drum 11 is provided with a suitable cam slot 11a, with which engages the roller 12 which rotates the crank 13 with the spindle 14. To the spindle 14 is keyed a toothed quadrant 15 which rotates the toothed quadrant 16 secured to the spindle 1 by means of spline and groove. The rear part 3a of the main spindle is provided with worm wheel teeth 17 which are driven by the worm 18, owing to which the whole main spindle is rotated. The main spindle is guided in the rear cover.

The toothed wheel K is cut by three cutters in the position such as N6, N1, N2. The other toothed wheel co-operating with the first one, has double helical teeth in the opposite direction and is cut by the cutters in the position N3, N4, N5 (Figure 18). To that end, the surface 9 must be rotated to 180° by the crank 19 and pin 20. The cutter head has at the bottom a bracket guide 21 and can be moved on the plate 22.

Figures 22 and 24 show the same machine as Figures 5 to 7, but for producing curved teeth, where instead of the carriage 72 (Figure 5), the cutter head G (Figure 19) is used. In this construction, the cutters and the blank rotate continuously and uniformly, that is to say, the transmission of the motion is altered inasmuch as the shaft 45 (Figure 24) transmits the rotatory movement through the differential gears 80, 81, 82, 83, etc. The feed for the involute proceeds from the ratchet wheel 65 to the worm wheel 54.

The cutter slide 39 is screwed fast after suitable adjustment of the cutter head G. Apart from this, everything remains as previously described.

Figure 23 shows the use of the cutter head G1 (Figures 20, 21) for the production of double helical teeth. The difference between Figures 22 and 23 is that in this case the oscillatory movement for the purpose of obtaining the double helical tooth is imparted by the crank (Figure 10) to the cutter head as in Figures 5 and 7 or to the blank.

What I claim is:

1. In a universal gear cutting machine of the rolling generating class, the combination of a cutter support having a straight-sided cutter thereon and means for imparting a cutting motion to the cutter such that the end of the cutter moves along a path in a plane, with a base having a slide carriage slidable thereon, a swivel carriage mounted for rotation on said slide carriage, blank supporting means comprising a slide mounted on the swivel carriage so as to be slidable thereon transversely to the direction of sliding of the slide carriage, a blank holder support rotatable on said slide about an axis transverse to the axis of rotation of the swivel carriage for adjusting the blank so that the path of the end of the cutter is tangential to the root cone or root cylinder of the gear to be cut, and a rotary blank holder having its axis of rotation in a plane perpendicular to the axis of rotation of the blank holder support, means for rotating the blank holder to index the blank, means for imparting to the blank holder an additional rotation for generating the tooth shape and means for rolling off the blank including a transmission lever operatively connected to the swivel carriage for turning the swivel carriage, means for releasably fixing the swivel carriage to the slide carriage, said transmission lever being adapted to displace the slide carriage when the swivel carriage is fixed thereto for imparting a rolling-off movement to a spur gear blank held on the blank holder, said slide carriage and slide serving for adjusting a bevel gear blank held on the blank holder so that the apex of the pitch cone of the blank lies on the axis of rotation of the swivel carriage, and means for fixing the slide carriage to the table to enable the transmission lever to impart a rolling off movement to a bevel gear blank held on the blank holder.

2. In a universal gear cutting machine the combination as set forth in claim 1, in which the means for operatively connecting the transmission lever to the swivel carriage comprise a strip ledge slidably mounted on the machine so as to be displaceable parallel to the direction of displacement of the slide carriage, radially adjustable actuating means for said strip ledge mounted on the transmission lever and steel strips connected to the said strip ledge and to the slide carriage.

3. In a universal gear cutting machine, the combination as set forth in claim 1, with a table interposed between the base and the slide carriage, said table being arranged for rotation about a vertical axis for enabling a spur gear blank to be set with its axis at an inclination with respect to the path of the cutter for cutting curved teeth on the blank.

4. In a universal gear cutting machine, the combination as set forth in claim 1, in which the cutter support is angularly adjustable on the machine for varying the angle of the cutting motion with respect to the blank.

5. In a universal gear cutting machine, the combination of a cutter support, a cutter slide and means for reciprocating the cutter slide, with a base having a slide carriage slidable thereon, a swivel carriage mounted for rotation on said slide carriage, blank supporting means comprising a slide mounted on the swivel carriage so as to be slidable thereon transversely to the direction of sliding of the slide carriage, a blank holder support rotatable on said slide about an axis transverse to the axis of rotation of the swivel carriage for adjusting the blank so that the path of the end of the cutter is tangential to the root cone or root cylinder of the gear to be cut, and a rotary blank holder having its axis of rotation in a plane perpendicular to the axis of rotation of the blank holder support, with a rotatable cutter spindle having a straight-sided cutter fixed thereon with the straight end of the cutter arranged radially with respect to the cutter spindle, means for turning the cutter spindle through 180° at each reversal of stroke of the cutter slide including a cam, a pinion fixed on the cutter spindle, a rack meshing with said pinion and arranged for reciprocation by said cam, and means for imparting rotary motion to the blank holder at each reversal of stroke of the cutter slide including a rotatable member operatively connected to the blank holder and having a pair of angularly spaced lugs thereon, a movable abutment member arranged so as to be moved into and out of the path of said lugs for arresting said rotatable member, means operatively connected to the cutter slide reciprocating means and including a movable clutch member for operating the rotatable member, means for moving said clutch member into and out of driving engagement with the rotatable member and means for withdrawing the movable abutment member from the path of the lugs, said lugs being spaced apart so that at one reversal of the cutter slide the cutting edge of the cutter is transferred from one side of the tooth gap to the other and on the next reversal the cutter is moved to cut the other side of the same tooth, means for angularly displacing the abutment for imparting to the blank holder an additional rotation for generating the tooth shape and means for rolling off the blank including a transmission lever operatively connected to the swivel carriage for turning the swivel carriage, means for releasably fixing the swivel carriage to the slide carriage, said transmission lever being adapted to displace the slide carriage when the swivel carriage is fixed thereto for imparting a rolling-off movement to a spur gear blank held on the blank holder, said slide carriage and slide serving for adjusting a bevel gear blank held on the blank holder so that the apex of the pitch cone of the blank lies on the axis of rotation of the swivel carriage, and means for fixing the slide carriage to the table to enable the transmission lever to impart a rolling off movement to a bevel gear blank held on the blank holder.

6. In a universal gear cutting machine the combination as set forth in claim 1, with an upright on the slide carriage and an adjustable pointer arranged thereon with its point located at the axis of rotation of the swivel carriage for locating the pitch cone apex of a bevel gear blank held by the blank holder so as to lie on the said axis of rotation.

7. In a universal gear cutting machine, the combination of a cutter support, a cutter slide and means for reciprocating the cutter slide, with a base having a slide carriage slidable thereon, a swivel carriage mounted for rotation on said slide carriage, blank supporting means comprising a slide mounted on the swivel carriage so as to be slidable thereon transversely to the direction of sliding of the slide carriage, a blank holder support rotatable on said slide about an axis transverse to the axis of rotation of the swivel carriage for adjusting the blank so that the path of the end of the cutter is tangential to the root cone or root cylinder of the gear to be cut and a rotary blank holder having its axis of rotation in a plane perpendicular to the axis of rotation of the blank holder support, with a cutter slide carriage slidable on the cutter slide transversely to the direction of reciprocation of the cutter slide, a rotatable cutter spindle on said cutter slide carriage having a straight-sided cutter fixed thereon with the straight end of the cutter arranged radially with respect to the cutter spindle, a drive shaft rotatable on the cutter slide and having a crank fixed thereon, a connecting rod connected to said crank and to said cutter slide carriage, means operatively connected to the drive shaft and to the means for reciprocating the cutter slide for imparting a sinusoidal cutting motion to the cutter during the reciprocation of the cutter slide for producing a helical tooth, a cam operatively connected to said drive shaft, a pinion fixed on the cutter spindle, a rack meshing with said pinion and arranged for reciprocation by said cam for turning the cutter to maintain the proper cutting angle during its sinusoidal motion, said cam being also adapted to turn the cutter spindle through 180° at each reversal of stroke of the cutter slide and means for imparting rotary motion to the blank holder at each reversal of stroke of the cutter slide including a rotatable member operatively connected to the blank holder and having a pair of angularly spaced lugs thereon, a movable abutment member arranged so as to be moved into and out of the path of said lugs for arresting said rotatable member, means operatively connected to the cutter slide reciprocating means and including a movable clutch member for operating the rotatable member, means for moving said clutch member into and out of driving engagement with the rotatable member and means for withdrawing the movable abutment member from the path of the lugs, said lugs being spaced apart so that at one reversal of the cutter slide the cutting edge of the cutter is transferred from one side of the tooth gap to the other and on the next reversal the cutter is moved to cut the other side of the same tooth, means for angularly displacing the abutment for imparting to the blank holder an additional rotation for generating the tooth shape and means for rolling off the blank including a transmission lever operatively connected to the swivel carriage for turning the swivel carriage, means for releasably fixing the swivel carriage to the slide carriage, said transmission lever being adapted to displace the slide carriage horizontally when the swivel carriage is fixed thereto for imparting a rolling-off movement to a spur gear blank held on the blank holder, said slide carriage and slide serving for adjusting a bevel gear blank held on the blank holder so that the apex of the pitch cone of the blank lies on the axis of rotation of the swivel carriage, and means for fixing the slide carriage to the table to enable the transmission lever to impart a rolling off movement to a bevel gear blank held on the blank holder.

8. In a universal gear cutting machine of the rolling generating class, the combination of a cutter support, a cutter slide and means for reciprocating the cutter slide, with a base having a slide carriage slidable thereon transversely with respect to the direction of reciprocation of the cutter slide, a swivel carriage mounted for rotation on said slide carriage about an axis intersecting the path of the cutter slide, a slide on the swivel carriage displaceable thereon transversely to the direction of sliding of the slide carriage, a blank holder support rotatable on said slide about an axis transverse to the axis of rotation of the blank holder support, means for rotating the blank holder to index the blank, means for imparting to the blank holder an additional rotation for generating the tooth shape and means for rolling off the blank including a transmission lever pivoted on the slide carriage, actuating means connected to said transmission lever for turning the lever, a strip ledge slidable on the slide carriage tangentially with respect to the swivel carriage, a slide block on the strip ledge in engagement with the transmission lever for displacement of the strip ledge by the transmission lever, said slide block being adjustable radially with respect to the transmission lever for varying the extent of displacement of the strip ledge, flexible connecting strips connected to the strip ledge and swivel carriage for turning the swivel carriage on the strip ledge being displaced, means for releasably fixing the swivel carriage to the slide carriage, said transmission lever being adapted to displace the slide carriage when the swivel carriage is fixed thereto for imparting a rolling-off movement to a spur gear blank held on the blank holder, said slide carriage and slide serving for adjusting a bevel gear blank held on the blank holder so that the apex of the pitch cone of the blank lies on the axis of rotation of the swivel carriage, and means for fixing the slide carriage to the table to enable the transmission lever to impart a rolling off movement to a bevel gear blank held on the blank holder.

9. In a universal gear cutting machine, the combination of a cutter support and a cutter slide displaceable on said cutter support, with a cutter holder rotatable on said cutter slide and having a straight-sided cutter thereon with the straight end of the cutter arranged radially with respect to the axis of rotation of the cutter holder, said cutter holder being displaceable transversely of the cutter slide, with a base having a slide carriage slidable thereon, a swivel carriage mounted for rotation on said slide carriage, blank supporting means comprising a slide mounted on the swivel carriage so as to be slidable thereon transversely to the direction of sliding of the slide carriage, a blank holder support rotatable on said slide about an axis transverse to the axis of rotation of the swivel carriage for adjusting the blank so that the path of the end of the cutter is tangential to the root cone or root cylinder of the gear to be cut, and a rotary blank holder having its axis of rotation in a plane perpendicular to the axis of rotation of the blank holder support, means including a drive shaft for rotating the blank holder to index the blank, means including an operating shaft connected to said drive shaft, for rotating the cutter holder and means connected to the drive shaft for displacing the cutter slide transversely for imparting a sinuous motion to the cutter, means for imparting to the blank holder an additional rotation for generating the tooth shape and means for rolling off the blank including a transmission lever operatively connected to the swivel carriage for turning the swivel carriage, means for releasably fixing the swivel carriage to the slide carriage, said transmission lever being adapted to displace the slide carriage when the swivel carriage is fixed thereto for imparting a rolling-off movement to a spur gear blank held on the blank holder, said slide carriage and slide serving for adjusting a bevel gear blank held on the blank holder so that the apex of the pitch cone of the blank lies on the axis of rotation of the swivel carriage, and means for fixing the slide carriage to the table to enable the transmission lever to impart a rolling off movement to a bevel gear blank held on the blank holder.

FRANCISZEK KACPER SAMEK.